United States Patent
Kats et al.

(10) Patent No.: US 12,452,212 B1
(45) Date of Patent: Oct. 21, 2025

(54) SYSTEMS AND METHODS FOR PREVENTING SOCIAL MEDIA HARASSMENT

(71) Applicant: GEN DIGITAL INC., Tempe, AZ (US)

(72) Inventors: Daniel Kats, Culver City, CA (US); Daniel Marino, Los Angeles, CA (US); Yun Shen, Bristol (GB); Acar Tamersoy, Culver City, CA (US)

(73) Assignee: Gen Digital Inc., Tempe, AZ (US)

( * ) Notice: Subject to any disclaimer, the term of this patent is extended or adjusted under 35 U.S.C. 154(b) by 396 days.

(21) Appl. No.: 17/510,204

(22) Filed: Oct. 25, 2021

(51) Int. Cl.
| | |
|---|---|
| *H04L 29/06* | (2006.01) |
| *G06Q 50/00* | (2012.01) |
| *H04L 9/40* | (2022.01) |
| *H04L 51/212* | (2022.01) |
| *H04L 51/52* | (2022.01) |

(52) U.S. Cl.
CPC ......... *H04L 63/0245* (2013.01); *G06Q 50/01* (2013.01); *H04L 51/212* (2022.05); *H04L 51/52* (2022.05)

(58) Field of Classification Search
CPC ....... H04L 43/10; H04L 9/006; H04L 9/0841; H04L 9/0861; H04L 9/3247; H04L 9/3263; H04L 63/0435; H04L 63/061; H04L 63/126; H04L 67/02; H04L 67/04; H04L 67/12; H04L 67/303; H04L 63/0442; H04L 63/0823; H04L 63/18; H04L 67/55; H04L 63/0245; H04L 51/212; H04L 51/52; G06F 11/3051; G06F 21/445; H04W 4/70; H04W 12/04; H04W 12/50; H04W 4/80; H04W 12/06; G06Q 50/01
See application file for complete search history.

(56) References Cited

U.S. PATENT DOCUMENTS

| | | | |
|---|---|---|---|
| 11,868,722 B1* | 1/2024 | Tully | G06F 40/284 |
| 2016/0234147 A1* | 8/2016 | Joel | H04W 4/60 |
| 2021/0360027 A1* | 11/2021 | Boyer | H04L 51/046 |

* cited by examiner

*Primary Examiner* — Joseph P Hirl
*Assistant Examiner* — Leynna Truvan
(74) *Attorney, Agent, or Firm* — Greenberg Traurig, LLP

(57) ABSTRACT

A computer-implemented method for preventing social media harassment may include (i) intercepting a message sent by a sender to a user via a social media service, (ii) performing topic modeling on content of the message, where the topic modeling is customized based on at least one harassment topic relevant to the user, (iii) calculating, based at least in part on the topic modeling, a probability that the message is harassment targeted at the user, and (iv) blocking the message in response to determining that the probability that the message is harassment meets a threshold for harassment probability. Various other methods, systems, and computer-readable media are also disclosed.

20 Claims, 7 Drawing Sheets

SYSTEMS AND METHODS FOR PREVENTING SOCIAL MEDIA HARASSMENT

BACKGROUND

Highly visible personalities on social media, such as journalists, politicians, and dissidents, may experience near-perpetual harassment. People whose primary jobs involve social media often do not have the option of disengaging. To give a scope to the problem, some highly visible journalists may experience hundreds of hate-messages per day. Harassment may be a problem even for lower-profile users of social media services, who may receive a distressing quantity of offensive messages even if that quantity isn't in the hundreds. As in the early days of email spam, some social media platforms have taken only the most rudimentary steps to limit person-to-person abuse on their platforms. As a result, the enforcement is largely left to individuals. This problem has also resurfaced more recently in the context of cyberbullying, which may have significant mental health impacts on children and young adults.

In some cases, a social media service may provide individuals with the capability to block, mute, or report offensive users or messages and/or manually set up primitive keyword-based filtering systems. However, these systems are often of limited effectiveness and may require a high degree of active management by the user. Reporting harassment after receiving it does not prevent the user from being exposed to the harassment and consumes the user's time and energy. The present disclosure, therefore, identifies and addresses a need for systems and methods for preventing social media harassment.

SUMMARY

As will be described in greater detail below, the present disclosure describes various systems and methods for preventing social media harassment via a combination of topic modeling and social graph analysis.

In one example, a computer-implemented method for blocking harassing social media messages may include (i) intercepting a message sent by a sender to a user via a social media service, (ii) performing topic modeling on content of the message, where the topic modeling is customized based on at least one harassment topic relevant to the user, (iii) calculating, based at least in part on the topic modeling, a probability that the message is harassment targeted at the user, and (iv) blocking the message in response to determining that the probability that the message is harassment meets a threshold for harassment probability.

In some examples, intercepting the message may include preventing the user from viewing the message. In some examples, determining that the probability that the message is harassment meets the threshold for harassment probability may include identifying the threshold for harassment probability set by the user.

In some examples, performing the topic modeling that is customized based on at least one harassment topic relevant to the user may include analyzing, via machine learning, harassing messages previously sent to the user via the social media service. Additionally or alternatively, performing the topic modeling that is customized based on at least one harassment topic relevant to the user may include analyzing, via human-in-the-loop learning, harassing messages previously sent to the user via the social media service.

In one embodiment, calculating, based at least in part on the topic modeling, the probability that the message is harassment targeted at the user may include analyzing, on the social media service, a social graph of the sender of the message that may include at least one additional user. In some examples, analyzing the social graph of the sender may include identifying at least one harasser in the social graph of the sender who has previously sent a harassing message to the user.

In one embodiment, the computer-implemented method may further include (i) detecting a group of messages that meet the threshold for harassment probability, (ii) identifying at least one commonality between the messages, and (iii) identifying, based at least in part on the at least one commonality, a precipitating incident that triggered the messages. In some embodiments, the computer-implemented method may further include, in response to identifying the precipitating incident, activating a high-security mode that triggers additional analysis of incoming messages to the user and/or a temporary decrease in the threshold for harassment probability. Additionally or alternatively, the computer-implemented method may further include, in response to identifying the precipitating incident, alerting the user about the precipitating incident.

In some examples, performing the topic modeling that is customized based on at least one harassment topic relevant to the user may include identifying at least one otherwise innocuous keyword that is found in benign messages sent to other users but has a high probability of being found in harassing messages sent to the user.

In one embodiment, a system for preventing social media harassment may include at least one physical processor and physical memory that includes computer-executable instructions that, when executed by the physical processor, cause the physical processor to (i) intercept a message sent by a sender to a user via a social media service, (ii) perform topic modeling on content of the message, where the topic modeling is customized based on at least one harassment topic relevant to the user, (iii) calculate, based at least in part on the topic modeling, a probability that the message is harassment targeted at the user, and (iv) block the message in response to determining that the probability that the message is harassment meets a threshold for harassment probability.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept a message sent by a sender to a user via a social media service, (ii) perform topic modeling on content of the message, where the topic modeling is customized based on at least one harassment topic relevant to the user, (iii) calculate, based at least in part on the topic modeling, a probability that the message is harassment targeted at the user, and (iv) block the message in response to determining that the probability that the message is harassment meets a threshold for harassment probability.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the present disclosure.

Figure 1:
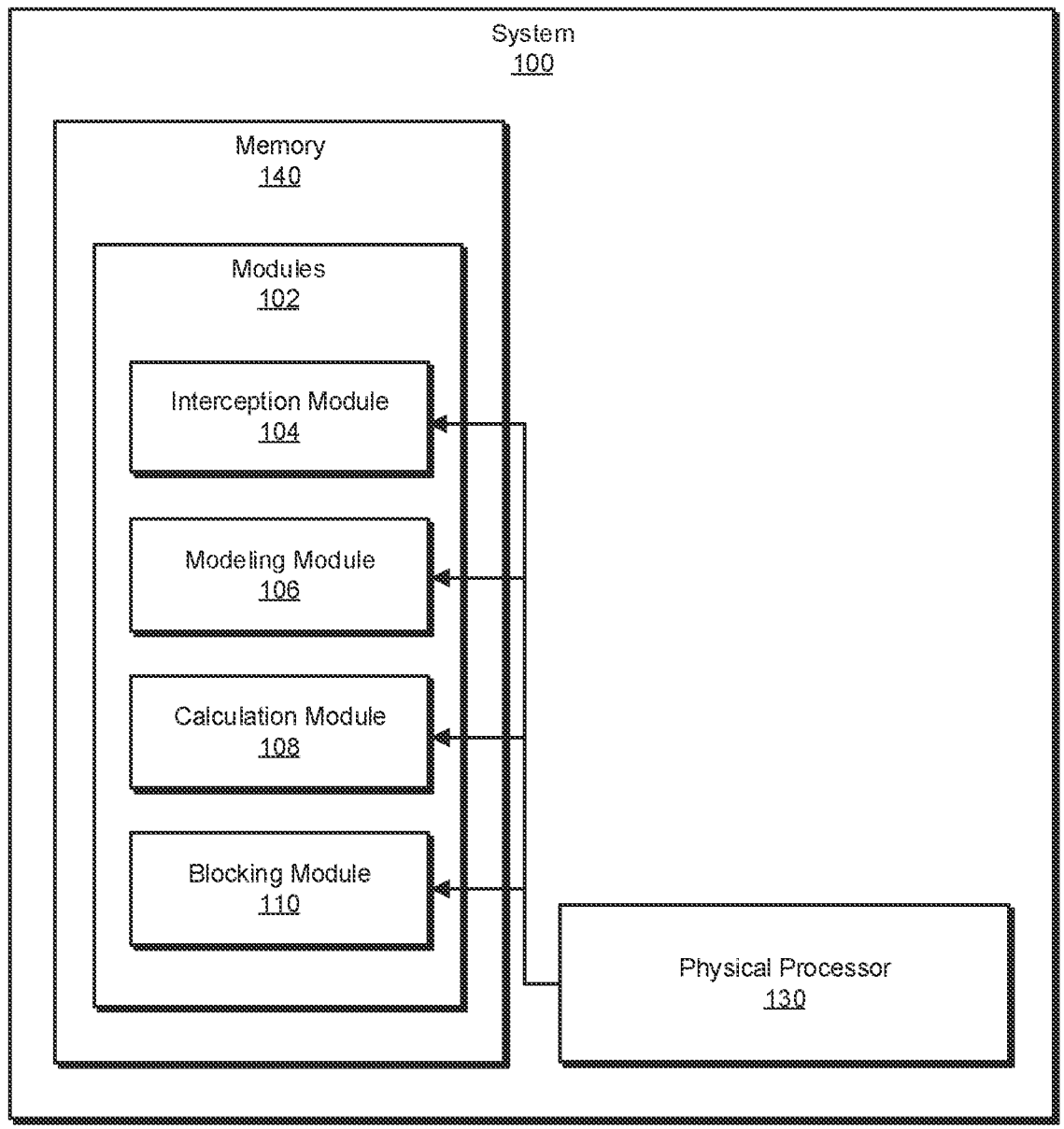
FIG. 1 is a block diagram of an example system for preventing social media harassment.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for preventing social media harassment. As will be explained in greater detail below, by building customized filters for each user and/or analyzing the social graph of senders, the systems described herein may identify harassing messages with a high degree of precision. By intercepting messages before they are received by the user, the systems described herein may prevent a user from being forced to read or interact with harassment, greatly improving the social media experience of the user.

In addition, the systems and methods described herein may improve the functioning of a computing device by detecting harassing messages with increased accuracy and thus improving the user experience of the operator of the computing device. These systems and methods may also improve the fields of social media, online safety, and/or anti-harassment by identifying harassment messages on social media based on customized heuristics and/or social graphs.

Figure 2:
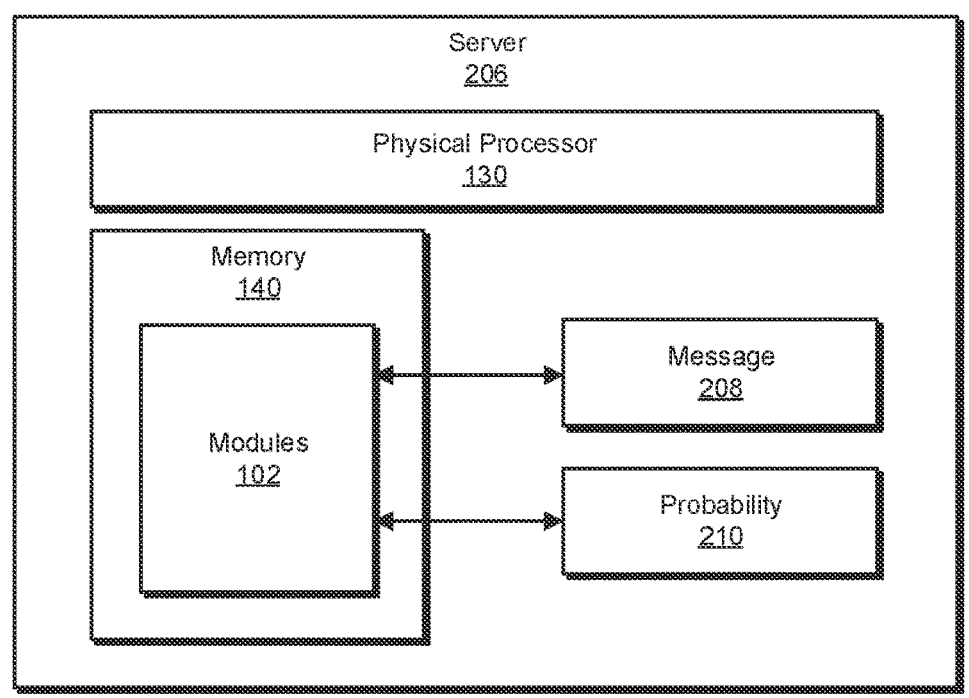
FIG. 2 is a block diagram of an additional example system for preventing social media harassment.

The following will provide, with reference to FIGS. 1-2, detailed descriptions of example systems for preventing social media harassment. Detailed descriptions of corresponding computer-implemented methods will also be provided in connection with FIGS. 3 and 5. Detailed descriptions of an example social graph will be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of an example system 100 for preventing social media harassment. As illustrated in this figure, example system 100 may include one or more modules 102 for performing one or more tasks. For example, and as will be explained in greater detail below, example system 100 may include an interception module 104 that intercepts a message sent by a sender to a user via a social media service. Example system 100 may additionally include a modeling module 106 that performs topic modeling on content of the message, wherein the topic modeling is customized based on at least one harassment topic relevant to the user. Example system 100 may also include a calculation module 108 that calculates, based at least in part on the topic modeling, a probability that the message is harassment targeted at the user. Example system 100 may additionally include a blocking module 110 that blocks the message in response to determining that the probability that the message is harassment meets a threshold for harassment probability. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as server 206 illustrated in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing social media harassment. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a server 206. In one example, all or a portion of the functionality of modules 102 may be performed by server 206 and/or any other suitable computing system. As will be described in greater detail below, one or more of modules 102 from FIG. 1 may, when executed by at least one processor of server 206, enable computing device 202 server 206 to prevent social media harassment. For example, and as will be described in greater detail below, one or more of modules 102 may cause server 206 to prevent social media harassment. For example, and as will be described in greater detail below, interception module 104 may intercept a message 208 sent by a sender to a user via a social media service. Next, modeling module 106 may perform topic modeling on content of message 208, where the topic modeling is customized based on at least one harassment topic relevant to the user. Calculation module 108 may calculate, based at least in part on the topic modeling, a probability 210 that message 208 is harassment targeted at the user. In some examples, blocking module 110 may block message 208 in response to determining that probability 210 that message 208 is harassment meets a threshold for harassment probability.

Server 206 generally represents any type or form of computing device that is capable interacting with messages on a social media service. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Figure 3:
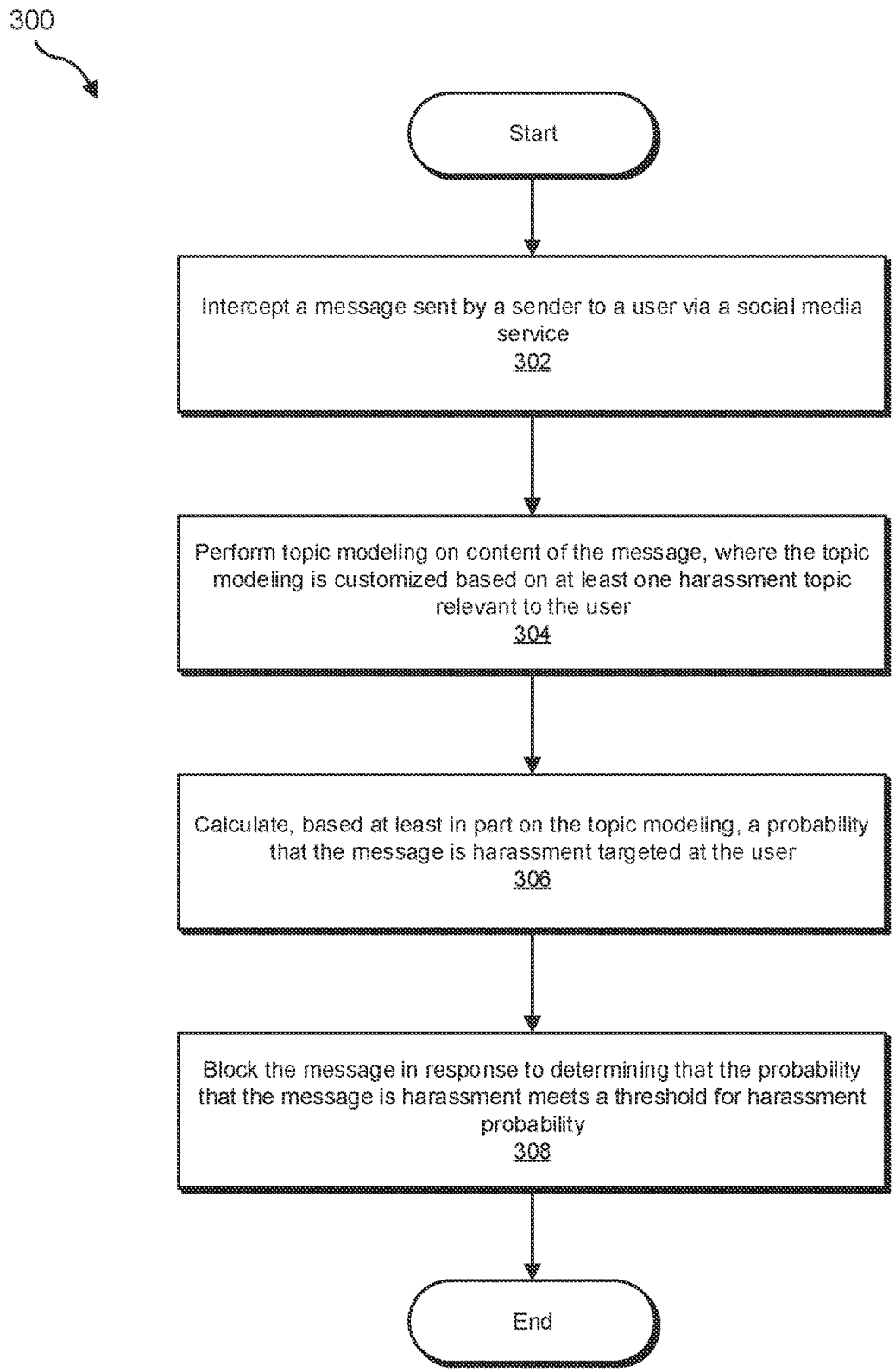
FIG. 3 is a flow diagram of an example method for preventing social media harassment.

FIG. 3 is a flow diagram of an example computer-implemented method 300 for preventing social media harassment. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may intercept a message sent by a sender to a user via a social media service. For example, interception module 104 may, as part of server 206 in FIG. 2, intercept message 208 sent by a sender to a user via a social media service.

The term "social media service," as used herein, generally refers to any service and/or platform that enables a user to create an account that can interact with other user accounts in the form of messages. In some embodiments, a social media service may enable users to create persistent connections with other users on the service by friending, following, adding, or otherwise designating another user as a social connection. In some embodiments, a social media service may enable a user to create a profile page that features information about the user. In one embodiment, a social media service may be a service designed primarily for social interaction via public and/or private messages. Additionally or alternatively, a social media service may be another type of platform with social features, such as a gaming platform or a news website that enables users to message one another. In one embodiment, the systems described herein may be built in to a social media service. In other embodiments, the systems described herein may be a third-party application that may interact with the social media service via an application programming interface (API) and/or other interface.

The term "message," as used herein, generally refers to a digital transmission from a sending user account to a recipient user account that includes some form of human-consumable content such as text, images, audio, and/or video. In one example, a message may be a private message and/or direct message that is viewable only by the sender and the recipient. In other examples, a message may be a public post that designates an intended recipient (e.g., via a tag within or attached to the message and/or via a location where the message is posted, such as the recipient's profile page) that is viewable to other users (e.g., social connections of the sender and/or recipient, authenticated users of the social media service, and/or any user).

Interception module 104 may intercept the message in a variety of ways. In one example, interception module 104 may hook into an API of the social media service to intercept the message and/or perform actions on the message. In some examples, interception module 104 may prevent the user from viewing the message. For example, interception module 104 may have permissions on the user's social media account that enable interception module 104 to temporarily block or hide the message while the systems described herein analyze the message. In one embodiment, interception module 104 may suppress notifications for the message so that the user does not receive a notification (e.g., a mobile push notification, a notification icon on a browser tab, an email, etc.) that the message was received.

At step 304, one or more of the systems described herein may perform topic modeling on content of the message, where the topic modeling is customized based on at least one harassment topic relevant to the user. For example, modeling module 106 may, as part of server 206 in FIG. 2, perform topic modeling on content of message 208, where the topic modeling is customized based on at least one harassment topic relevant to the user.

The phrase "topic modeling," as used herein, generally refers to any type of statistical model for discovering topics in text. In some embodiments, topic modeling may include machine learning and/or natural language processing. In one embodiment, the systems described herein may perform topic modeling on messages received by the user to discover topics of harassment. In some examples, performing topic modeling on messages may detect themes of harassment. In one example, a theme of harassment may have associated words and/or phrases that are found in the source data (e.g., messages) as well as words and/or phrases not found in the source data but which may be used in harassing messages in the future. For example, a topic modeling algorithm may detect "weight" as a theme of harassment based on finding the keywords "exercise," "whale," and "diet," and may then flag the words "gym," "fork," and "calories" as additional keywords relevant to the topic of "weight" that are not present in a specific message but may be present in other messages on the topic. Unlike sentiment analysis, topic modeling may identify broad topics or themes in text rather than attempting to categorize text as having a particular sentiment or tone based on predetermined keywords and/or formatting.

Modeling module 106 may perform topic modeling in a variety of ways. In one example, modeling module 106 may perform the topic modeling that is customized based on at least one harassment topic relevant to the user by analyzing, via machine learning and/or natural language processing, harassing messages previously sent to the user via the social media service.

In some embodiments, modeling module 106 may perform the topic modeling that is customized based on at least one harassment topic relevant to the user by analyzing, via human-in-the-loop learning, harassing messages previously sent to the user via the social media service. For example, modeling module 106 may analyze messages marked by the user and/or social media service as harassment. In some examples, modeling module 106 may analyze harassing and benign messages to detect words and/or phrases that appear more commonly in harassing messages.

In some examples, modeling module 106 may perform the topic modeling by identifying at least one otherwise innocuous keyword that is found in benign messages sent to other users but has a high probability of being found in harassing messages sent to the user. For example, the words "exercise" or "gym" are typically innocuous words that might commonly occur in benign messages between friends or acquaintances planning or discussing activities. A user who is a fitness influencer will likely receive many legitimate messages that include the words "exercise" or "gym." However, if the user is a plus-size model, messages to the user containing the words "exercise" or "gym" are unlikely to be benign and very likely to be harassment related to the user's weight. By using topic modeling to create a custom filter, the systems described herein may identify harassing messages targeted at a particular user with a much higher degree of accuracy than systems that look for universally negative keywords and phrases.

At step 306, one or more of the systems described herein may calculate, based at least in part on the topic modeling, a probability that the message is harassment targeted at the user. For example, calculation module 108 may, as part of server 206 in FIG. 2, calculate, based at least in part on the topic modeling, probability 210 that message 208 is harassment targeted at the user.

The term "harassment," as used herein, generally refers to any message intended to provoke a negative response in the recipient. In some examples, harassing messages may be sent by individual senders acting alone. In other examples, harassing messages may be sent by coordinated campaigns of groups of senders.

Calculation module 108 may calculate the probability that the message is harassment in a variety of ways. For example, calculation module 108 may weight various topics, words, phrases, and/or other elements (e.g., message structure, additional media such as links and/or images, etc.) as having an associated probability of harassment and sum up the total weights.

In some embodiments, calculation module 108 may factor in additional features of the message and/or sender into the probability that the message is harassment. In one embodiment, calculation module 108 may calculate the probability that the message is harassment targeted at the user by analyzing, on the social media service, a social graph of the sender of the message that includes at least one additional user (i.e., a social graph that includes more than just the sender and the user).

The term "social graph," as used herein, may generally refer to any conceptual mapping of relationships between users of a social media service. For example, a social graph may include persistent and/or public relationships between users such as friend and/or follow connections. In another example, a social graph may include relationships between users indicated by previous messages between the users and/or participation in the same events and/or activities (e.g., attendance at the same in-person event, playing a match of an online game together, etc.). In some examples, a social graph may include relationships implied by shared membership in groups (e.g., social media groups, affiliation groups such as sports or media fandoms indicated on users' profiles, etc.). In many examples of online harassment, many members of a connected social group may send harassing messages to a target. Thus, a message from a member of that group is more likely to be harassment than a message from an unconnected sender.

Figure 4:
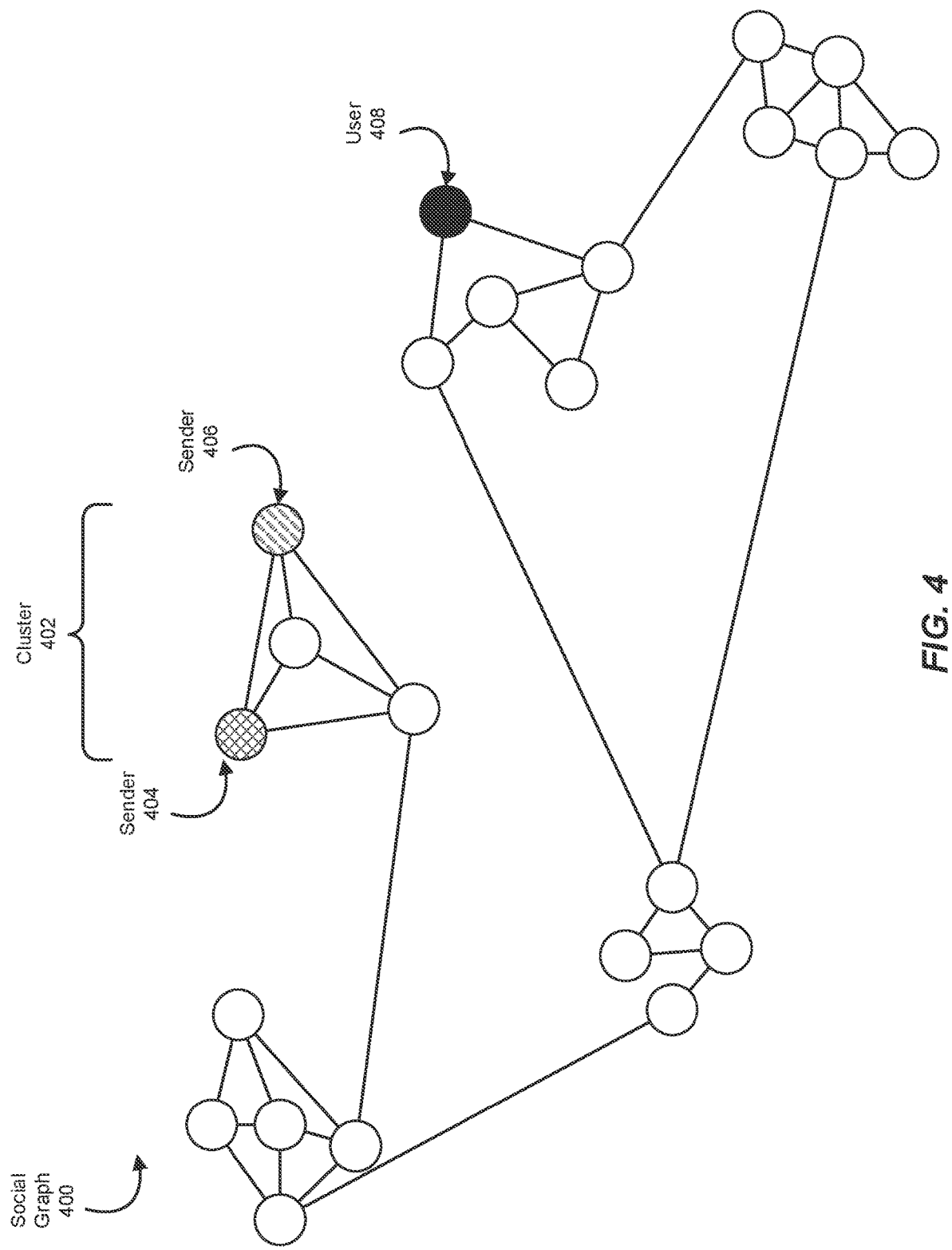
FIG. 4 is an illustration of an example social graph on a social media service.

In some examples, the systems described herein may identify at least one harasser in the social graph of the sender who has previously sent a harassing message to the user. For example, as illustrated in FIG. 4, a social graph 400 may include a variety of clusters of users who are connected with one another. In some examples, a user 408 may receive a message from a sender 404. In one example, the systems described herein may determine that sender 404 is part of the same cluster 402 and/or is directly connected to a sender 406 who has previously sent a harassing message to user 408. In this example, the systems described herein may determine that the message from sender 404 is more likely to be harassment based on the social graph connection between sender 404 and sender 406. In some examples, user 408 may have received multiple harassing messages from members of cluster 402. In these examples, the systems described herein may determine that it is highly probable that a message from sender 404 is harassment.

At step 308, one or more of the systems described herein may block the message in response to determining that the probability that the message is harassment meets a threshold for harassment probability. For example, blocking module 110 may, as part of server 206 in FIG. 2, block message 208 in response to determining that probability 210 that message 208 is harassment meets a threshold for harassment probability.

Blocking module 110 may block the message in a variety of ways. For example, blocking module 110 may mark the message as read, move the message to a special folder, mark the message as hidden, delete the message, and/or report the message to the social media service as harassment. In some embodiments, blocking module 110 may block or not block messages based at least in part on user preferences. For example, the systems described herein may determine that the probability that the message is harassment meets the threshold for harassment probability by identifying the threshold for harassment probability set by the user (e.g., 70%, 80%, 95%, etc.). Some users may have a higher tolerance for harassing messages and a lower tolerance for accidentally missing benign messages, while other users may feel differently. By detecting user preferences, blocking module 110 may err on the side the user is most comfortable with.

In some cases, large quantities of harassing messages may be precipitated by a specific incident, such as a news article. In one embodiment, systems described herein may (I) detect a plurality of messages that meet the threshold for harassment probability, (ii) identify at least one commonality between the plurality of messages, and (ill) identify, based at least in part on the at least one commonality, a precipitating incident that triggered the plurality of messages. For example, the systems described herein may detect several (or in some cases several dozen) messages that are all directed to the same topic and may determine that the messages were likely precipitated by an article related to the topic. In some embodiments, the systems described herein may identify a precipitating incident based on volume analysis. For example, if the volume of harassment received by a user suddenly increases compared to the historical volume, the systems described herein may determine that a precipitating incident likely caused the increase even if there is no special commonality between the harassing messages.

In one embodiment, systems described herein may, in response to identifying the precipitating incident, activate a high-security mode that triggers at least one of additional analysis of incoming messages to the user and/or a temporary decrease in the threshold for harassment probability. For example, the systems described herein may perform a deeper social graph analysis (e.g., analyzing a sender's profile in more depth, analyzing social connections that are farther degrees away than normally, etc.) on senders during the high-security mode. In another example, the systems described herein may block messages at a lower probability threshold than usual (e.g., an 80% probability rather than a 90% probability) during the high-security mode. Activating the high-security mode may enable the systems described herein to catch a larger portion of harassing messages originating from a precipitating incident, decreasing the burden on the user.

Additionally or alternatively, systems described herein may, in response to identifying the precipitating incident, alert the user about the precipitating incident. For example, the systems described herein may notify the user that a high number of harassing messages (e.g., five messages, fifty messages, or one hundred messages) about a specific topic have been blocked and thus the messages were likely triggered by some incident related to the topic. In some embodiments, the systems described herein may enable a user to manually flag a precipitating incident and/or enable the high-security mode.

Figure 5:
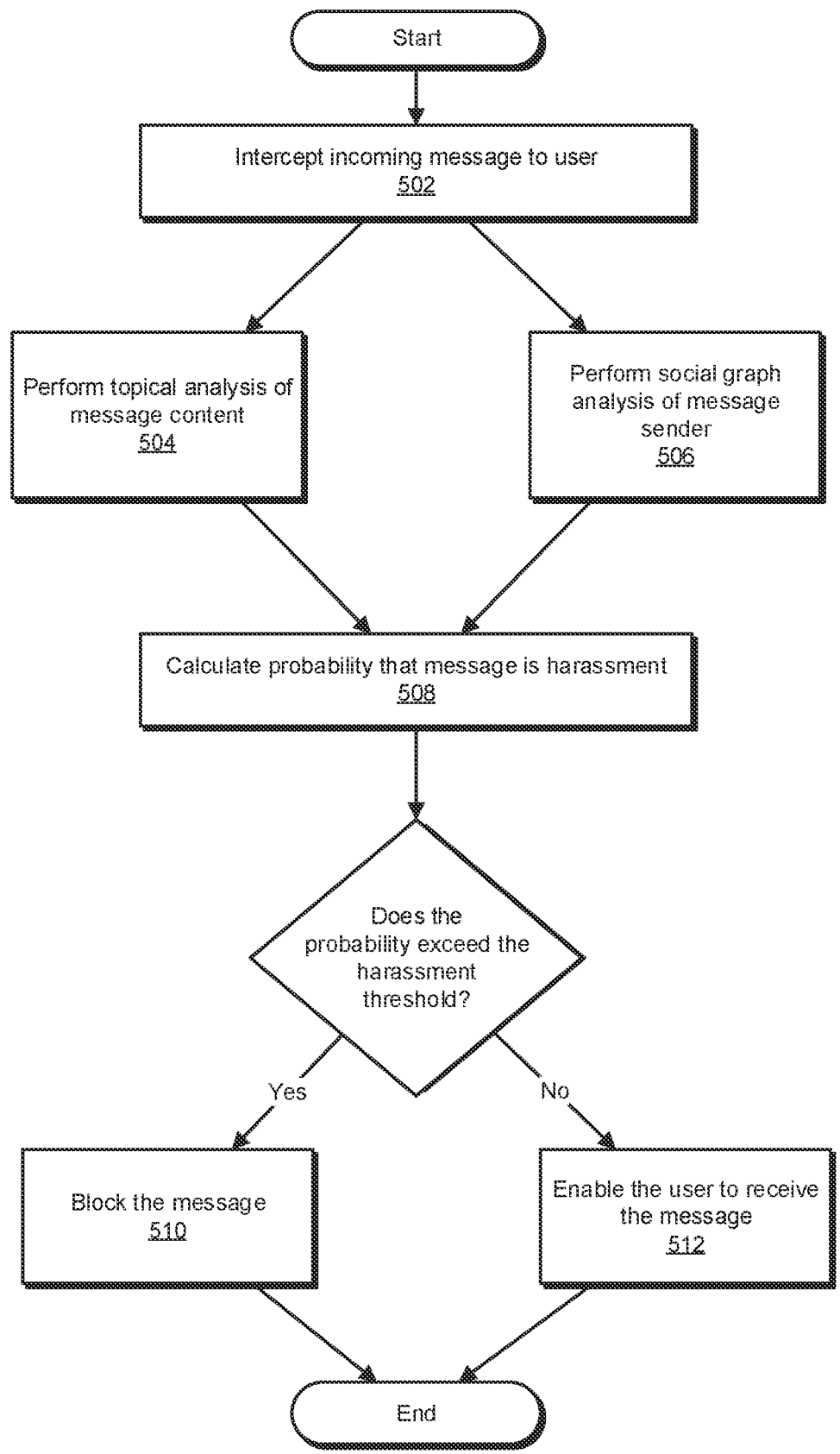
FIG. 5 is a flow diagram of an example method for preventing social media harassment.

In some embodiments, the systems described herein may concurrently analyze the content of the message and the sender of the message. For example, as illustrated in FIG. 5, at step 502 the systems described herein may intercept an incoming message to the user. At step 504, the systems described herein may perform a topical analysis of the message while simultaneously, at step 506, the systems described herein may perform a social graph analysis of the message sender. At step 508, the systems described herein may calculate the probability that the message is harassment based on both the topic modeling and the social graph analysis. In some examples, at step 510, if the probability exceeds the harassment threshold, the systems described herein may block the message, while at step 512, if the probability does not exceed the harassment threshold, the systems described herein may enable the user to receive the message (e.g., by un-hiding the message, forwarding a notification about the message to the user, etc.).

As explained above in connection with method 300 in FIG. 3, the systems and methods described herein may reduce or prevent social media harassment via a combination of topic modeling and (on social media services where it's possible to deduce social graphs) social graph analysis. By detecting topics of harassment relevant to the user, rather than a fixed set of predetermined keywords or phrases, the systems described herein may create accurate, personalized filters that catch harassing messages composed of otherwise innocuous words. By detecting precipitating incidents, the systems described herein may protect users against high volumes of harassment triggered by incidents such as controversial news articles, posts, videos and/or media appearances. Preventing harassing messages in this way may lead to a significantly better social media experience for users, increasing usage of social media as well as improving users' mental health.

Figure 6:
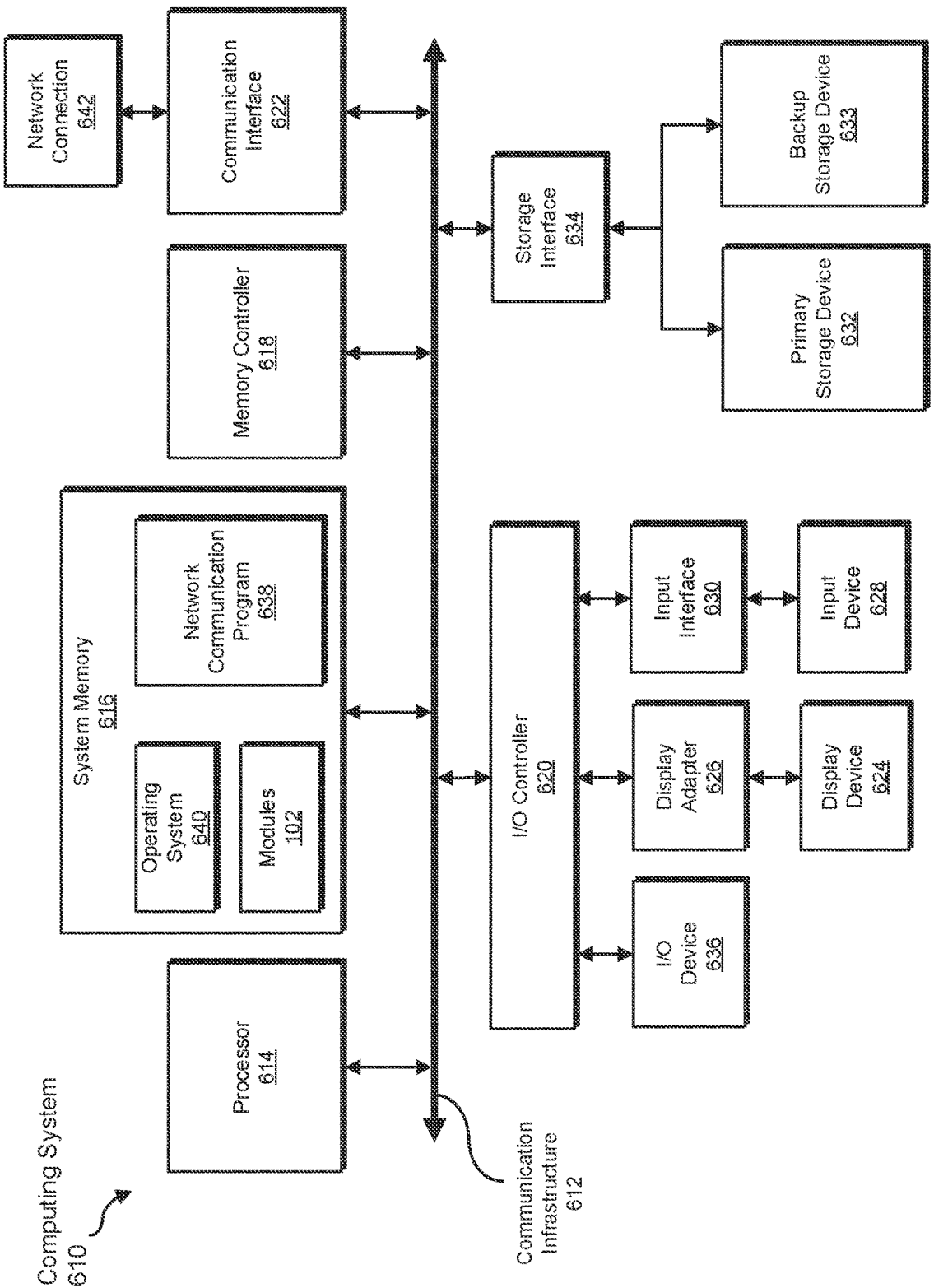
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
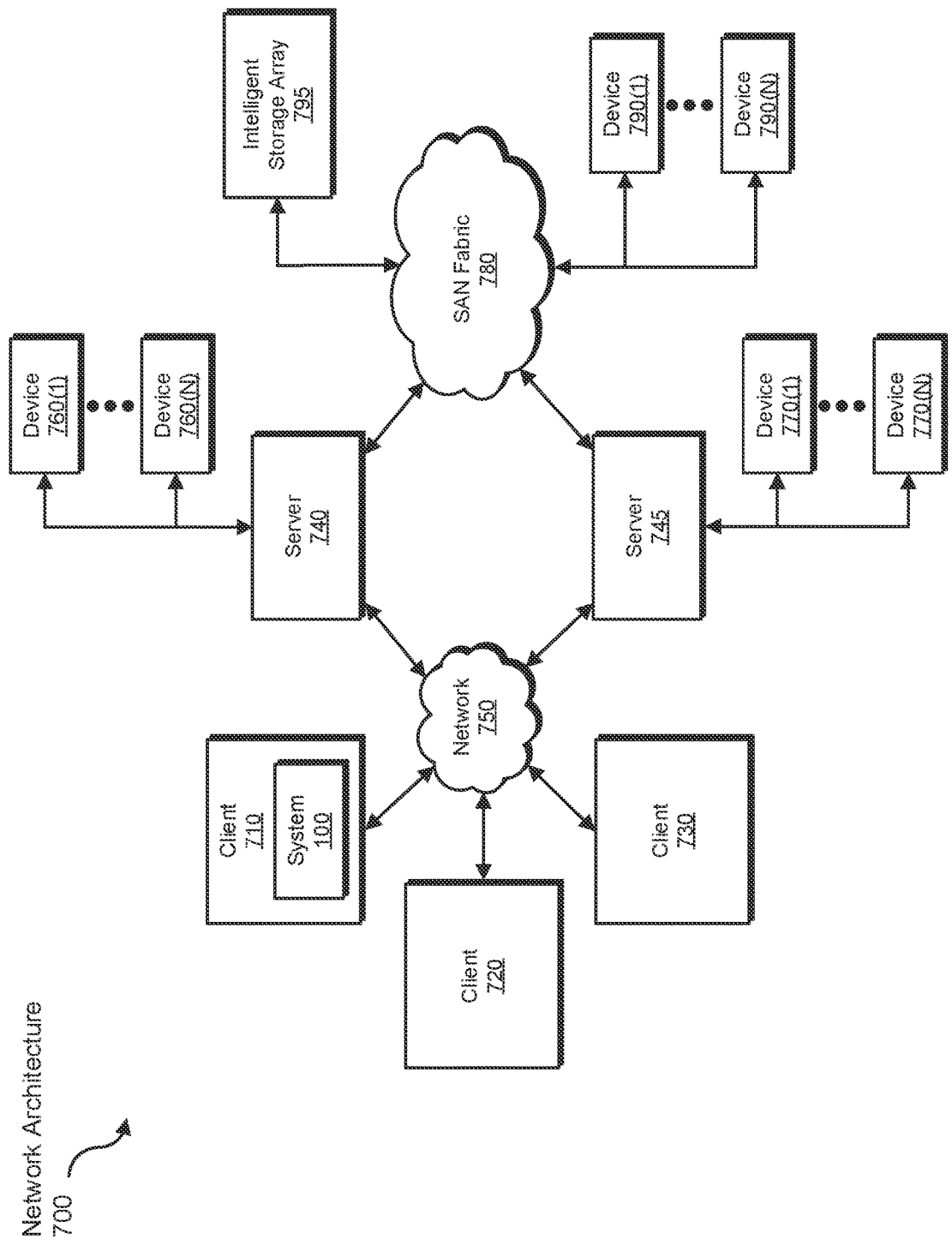
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750.

Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing social media harassment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive message data to be transformed, transform the message data via machine learning and/or other analysis, output a result of the transformation to a machine learning model and/or other classifier, use the result of the transformation to determine whether the message is harassment, and store the result of the transformation to maintain a log of messages. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing social media harassment, at least a portion of the method being performed by a computing device comprising at least one processor, the method comprising:
    identifying, based on an analysis of previous messages received by a user via a social media service and further based on the user marking a subset of the previous messages as harassing messages directed at the user, at least one harassment topic relevant to the user;
    intercepting a message sent by a sender, via the social media service, to the user as a recipient of the message;
    performing topic modeling on content of the message to identify one or more topics of the message, wherein the topic modeling is customized based on the at least one harassment topic relevant to the user and is further customized based at least in part on the user's preferences and the subset of the previous messages marked by the user;
    calculating, based at least in part on the topic modeling, a probability that the message is harassment targeted at the user by weighting the identified one or more topics with respect to the at least one harassment topic; and
    preventing the user from receiving the message in response to determining that the probability that the message is harassment meets a threshold for harassment probability.

2. The computer-implemented method of claim 1, wherein intercepting the message comprises preventing the user from viewing the message.

3. The computer-implemented method of claim 1, wherein performing the topic modeling that is customized based on at least one harassment topic relevant to the user comprises analyzing, via machine learning, harassing messages previously sent to the user via the social media service.

4. The computer-implemented method of claim 1, wherein performing the topic modeling that is customized based on at least one harassment topic relevant to the user comprises analyzing, via human-in-the-loop learning, harassing messages previously sent to the user via the social media service.

5. The computer-implemented method of claim 1, wherein calculating, based at least in part on the topic modeling, the probability that the message is harassment targeted at the user comprises analyzing, on the social media service, a social graph of the sender of the message that comprises at least one additional user.

6. The computer-implemented method of claim 5, wherein analyzing the social graph of the sender comprises identifying at least one harasser in the social graph of the sender who has previously sent a harassing message to the user.

7. The computer-implemented method of claim 1, wherein determining that the probability that the message is harassment meets the threshold for harassment probability comprises identifying the threshold for harassment probability set by the user.

8. The computer-implemented method of claim 1, further comprising:
    detecting a plurality of messages that meet the threshold for harassment probability;
    identifying at least one commonality between the plurality of messages; and
    identifying, based at least in part on the at least one commonality, a precipitating incident that triggered the plurality of messages.

9. The computer-implemented method of claim 8, further comprising, in response to identifying the precipitating incident, activating a high-security mode that triggers at least one of:
    additional analysis of incoming messages to the user; and
    a temporary decrease in the threshold for harassment probability.

10. The computer-implemented method of claim 8, further comprising, in response to identifying the precipitating incident, alerting the user about the precipitating incident.

11. The computer-implemented method of claim 1, wherein performing the topic modeling that is customized based on at least one harassment topic relevant to the user comprises identifying at least one otherwise innocuous keyword that is found in benign messages sent to other users but has a high probability of being found in harassing messages sent to the user.

12. A system for preventing social media harassment, the system comprising:
    at least one physical processor;
    physical memory comprising computer-executable instructions that, when executed by the physical processor, cause the physical processor to:
        identify, based on an analysis of previous messages received by a user via a social media service and further based on the user marking a subset of the previous messages as harassing messages directed at the user, at least one harassment topic relevant to the user;
        intercept a message sent by a sender, via the social media service, to the user as a recipient of the message;
        perform topic modeling on content of the message to identify one or more topics of the message, wherein the topic modeling is customized based on the at least one harassment topic relevant to the user and is further customized based at least in part on the user's preferences and the subset of the previous messages marked by the user;
        calculate, based at least in part on the topic modeling, a probability that the message is harassment targeted at the user by weighting the identified one or more topics with respect to the at least one harassment topic; and prevent the user from receiving the message in response to determining that the probability that the message is harassment meets a threshold for harassment probability.

13. The system of claim 12, wherein intercepting the message comprises preventing the user from viewing the message.

14. The system of claim 12, wherein performing the topic modeling that is customized based on at least one harassment topic relevant to the user comprises analyzing, via machine learning, harassing messages previously sent to the user via the social media service.

15. The system of claim 12, wherein performing the topic modeling that is customized based on at least one harassment topic relevant to the user comprises analyzing, via human-in-the-loop learning, harassing messages previously sent to the user via the social media service.

16. The system of claim 12, wherein calculating, based at least in part on the topic modeling, the probability that the message is harassment targeted at the user comprises analyzing, on the social media service, a social graph of the sender of the message that comprises at least one additional user.

17. The system of claim 16, wherein analyzing the social graph of the sender comprises identifying at least one harasser in the social graph of the sender who has previously sent a harassing message to the user.

18. The system of claim 12, wherein determining that the probability that the message is harassment meets the threshold for harassment probability comprises identifying the threshold for harassment probability set by the user.

19. The system of claim 12, wherein the computer-executable instructions cause the physical processor to:

detect a plurality of messages that meet the threshold for harassment probability;
identify at least one commonality between the plurality of messages; and
identify, based at least in part on the at least one commonality, a precipitating incident that triggered the plurality of messages.

20. A non-transitory computer-readable medium comprising one or more computer-executable instructions that, when executed by at least one processor of a computing device, cause the computing device to:

identify, based on an analysis of previous messages received by a user via a social media service and further based on the user marking a subset of the previous messages as harassing messages directed at the user, at least one harassment topic relevant to the user;

intercept a message sent by a sender, via the social media service, to the user as a recipient of the message;

perform topic modeling on content of the message to identify one or more topics of the message, wherein the topic modeling is customized based on the at least one harassment topic relevant to the user and is further customized based at least in part on the user's preferences and the subset of the previous messages marked by the user;

calculate, based at least in part on the topic modeling, a probability that the message is harassment targeted at the user by weighting the identified one or more topics with respect to the at least one harassment topic; and prevent the user from receiving the message in response to determining that the probability that the message is harassment meets a threshold for harassment probability.

* * * * *